(12) United States Patent
Ogata et al.

(10) Patent No.: US 8,437,278 B2
(45) Date of Patent: May 7, 2013

(54) SERVICE PROVIDING APPARATUS FOR DIGITAL PROCESSING SERVICE, WIRELESS COMMUNICATION SYSTEM, AND WIRELESS COMMUNICATION METHOD

(75) Inventors: Hideaki Ogata, Yokohama (JP); Ryoichi Shimizu, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 279 days.

(21) Appl. No.: 12/829,327

(22) Filed: Jul. 1, 2010

(65) Prior Publication Data

US 2011/0002271 A1 Jan. 6, 2011

(30) Foreign Application Priority Data

Jul. 2, 2009 (JP) ................................. 2009-157878

(51) Int. Cl.
*H04W 4/00* (2009.01)
*H04W 92/00* (2009.01)
(52) U.S. Cl.
USPC ............................. 370/254; 370/310; 455/41.3
(58) Field of Classification Search ........................ None
See application file for complete search history.

(56) References Cited

U.S. PATENT DOCUMENTS

| | | | |
|---|---|---|---|
| 7,290,067 B2 | 10/2007 | Fukunaga et al. | |
| 7,543,043 B2 | 6/2009 | Noda et al. | |
| 2006/0067295 A1* | 3/2006 | Lehotsky et al. | 370/351 |
| 2006/0168153 A1* | 7/2006 | Lin | 709/220 |
| 2006/0285502 A1* | 12/2006 | Bigioi et al. | 370/254 |
| 2007/0060054 A1* | 3/2007 | Romesburg | 455/41.2 |
| 2007/0087780 A1* | 4/2007 | Nassimi | 455/556.1 |
| 2008/0218774 A1* | 9/2008 | Shuldman et al. | 358/1.2 |
| 2008/0229402 A1* | 9/2008 | Smetters et al. | 726/9 |
| 2009/0296603 A1* | 12/2009 | Hamadi et al. | 370/254 |
| 2010/0048134 A1* | 2/2010 | McCarthy et al. | 455/41.3 |
| 2010/0165879 A1* | 7/2010 | Gupta et al. | 370/254 |

FOREIGN PATENT DOCUMENTS

| | | |
|---|---|---|
| JP | 2002-312155 A | 10/2002 |
| JP | 2003-229872 A | 8/2003 |
| JP | 2004-013718 A | 1/2004 |
| JP | 2005-032232 A | 2/2005 |
| JP | 2005-033779 A | 2/2005 |
| JP | 2005-303565 A | 10/2005 |
| JP | 2008-090561 A | 4/2008 |
| JP | 2008-278522 A | 11/2008 |
| WO | WO 03/047173 A1 | 6/2003 |
| WO | WO 2008/041591 A1 | 4/2008 |

* cited by examiner

*Primary Examiner* — Min Jung
(74) *Attorney, Agent, or Firm* — Kilpatrick Townsend & Stockton LLP

(57) ABSTRACT

A service providing apparatus that provides a digital processing service and performs wireless communication with a service use apparatus that uses the service includes: a wireless communication unit that performs wireless communication; an interface unit that enables the attachment of a portable wireless communication device that performs wireless communication for the apparatus to which the wireless communication device is attached when the wireless communication device is attached; a generation unit that generates configuration information for wireless communication; and a configuration unit that executes, on the wireless communication device attached to the interface unit, based on the configuration information generated by the generation unit, a configuration process that enables wireless communication between the service use apparatus to which the wireless communication device has been attached and the wireless communication unit.

9 Claims, 3 Drawing Sheets

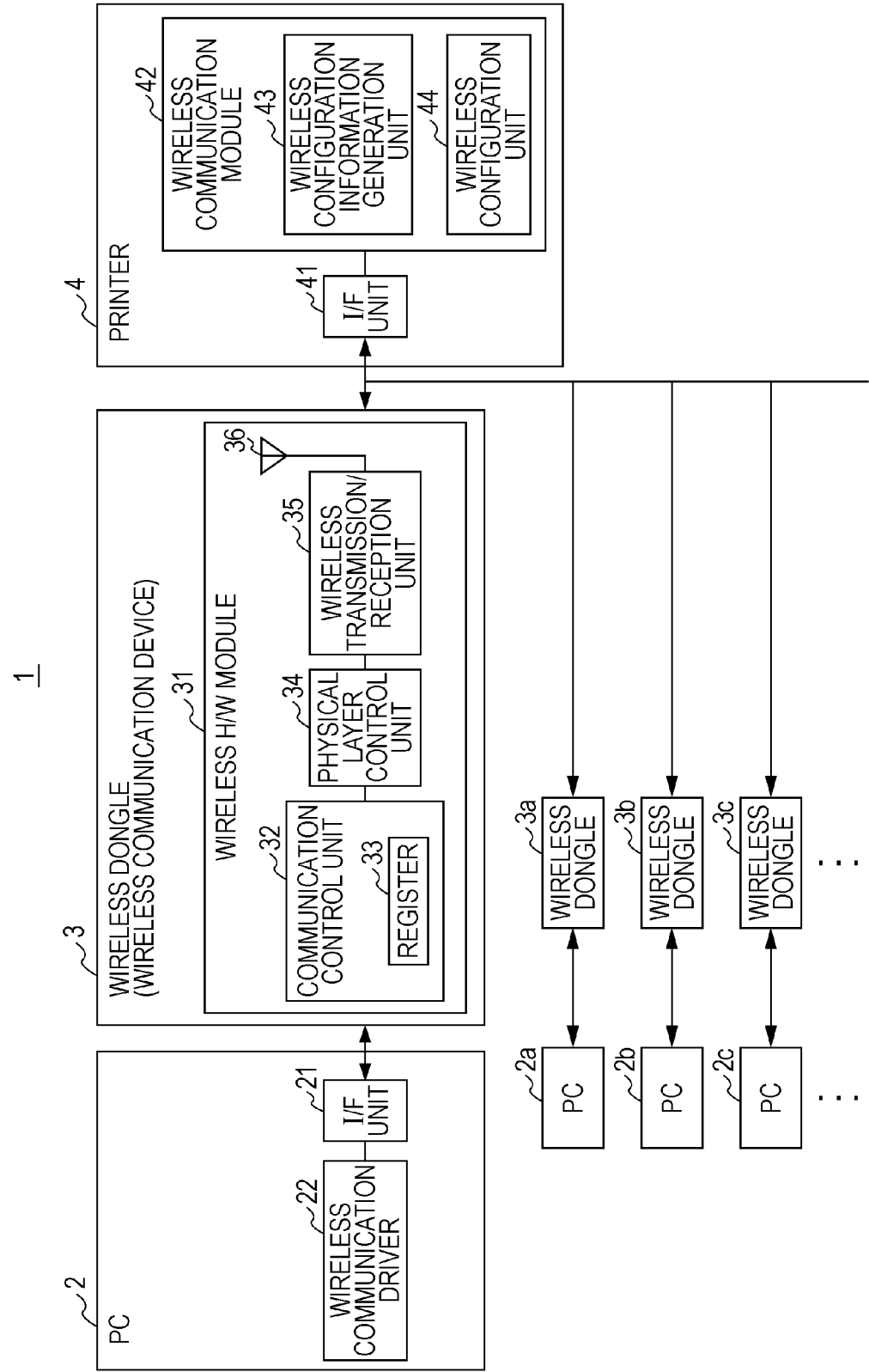

FIG. 2A
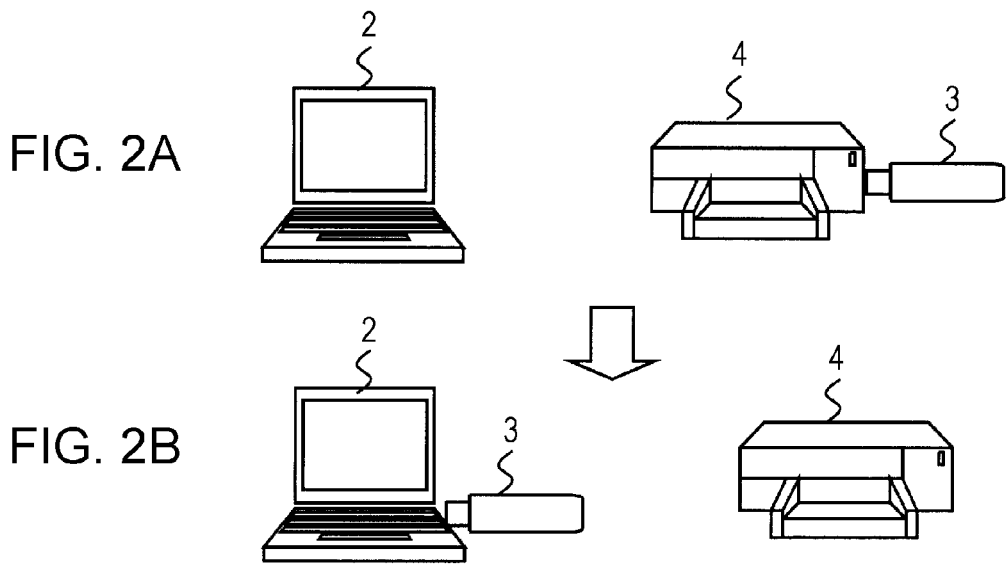
FIG. 2B
FIG. 3
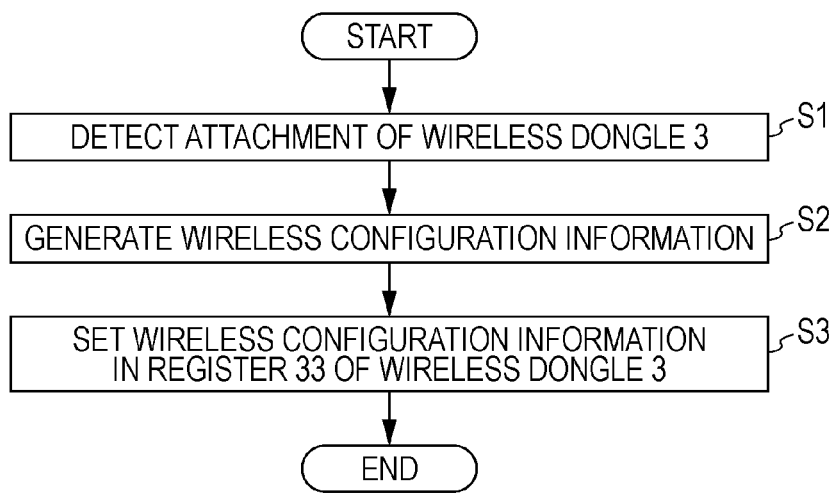

WIRELESS CONFIGURATION INFORMATION

| | |
|---|---|
| BAND | IEEE802.11g |
| NETWORK MODE | AD HOC MODE |
| NETWORK NAME | Printer-net |
| WIRELESS CHANNEL | 11 |
| AUTHENTICATION LEVEL | OPEN SYSTEM |
| ENCRYPTION LEVEL | 128bit |
| ENCRYPTION KEY | xxxx |
| IP ADDRESS | 192.168.0.1 |
| SUBNET MASK | 255.255.255.0 |
| DEFAULT GATEWAY | 192.168.0.x |

# SERVICE PROVIDING APPARATUS FOR DIGITAL PROCESSING SERVICE, WIRELESS COMMUNICATION SYSTEM, AND WIRELESS COMMUNICATION METHOD

BACKGROUND

1. Technical Field

The present invention relates to service providing apparatuses such as printers that provide digital processing services using wireless communication, and particularly relates to service providing apparatuses and the like that are capable of easily making configurations that enable wireless communication.

2. Related Art

Thus far, apparatuses such as printers, projectors, hard disk systems, and so on that provide digital processing services have been used by personal computers and the like through wired/wireless communication.

When using wireless communication in such a case, it is necessary to perform configuration operations for the wireless communication on each apparatus, and because these operations require specialized knowledge to perform, there have been difficult aspects for general users.

Accordingly, JP-A-2008-90561 proposes a device that facilitates communication connection operations between a computer and an image projecting apparatus, and discloses a USB device in which a wireless communication unit is provided in a USB memory. In this proposal, wireless configuration information that has been written into the device from the image projecting apparatus is first loaded into the computer, and wireless communication is enabled by the computer transmitting the loaded wireless configuration information to the device.

However, in JP-A-2008-90561, the device that acts as the intermediary for the communication between the computer and the image projecting apparatus is a complex device in which a wireless communication unit is combined with a memory, and thus it is necessary to have the device prepared as a dedicated apparatus for implementing the communication according to the stated proposal. Furthermore, because predetermined processes are executed on the device by the computer and the image projecting apparatus, it is necessary to make special preparations for both of those apparatuses as well. Accordingly, in terms of the device environment, it cannot be said that the preparations required for carrying out the stated wireless communication are simple. Moreover, it is also necessary to carry out processing in both the image projecting apparatus and the computer during the configuration operations for wireless communication, and thus issues with respect to simplicity remain.

SUMMARY

An advantage of some aspects of the invention is to provide a service providing apparatus such as a printer that provides a digital processing service using wireless communication, the service providing apparatus being capable of performing configurations that enable wireless communication more easily than in the past and capable of constructing a device environment for that purpose with ease.

An aspect of the invention is a service providing apparatus that provides a digital processing service and performs wireless communication with a service use apparatus that uses the service, the service providing apparatus including: a wireless communication unit that performs wireless communication; an interface unit that enables the attachment of a portable wireless communication device that performs wireless communication for the apparatus to which the wireless communication device is attached when the wireless communication device is attached; a generation unit that generates configuration information for wireless communication; and a configuration unit that executes, on the wireless communication device attached to the interface unit, based on the configuration information generated by the generation unit, a configuration process that enables wireless communication between the service use apparatus to which the wireless communication device has been attached and the wireless communication unit.

Furthermore, in a preferred aspect of the stated invention, the wireless communication device includes a register, and the configuration unit enables the wireless communication by setting the configuration information in the register.

Furthermore, in a preferred aspect of the stated invention, the configuration unit is capable of executing the configuration process for two or more wireless communication devices, and the configuration information set in the register is the same for all of the wireless communication devices aside from information that identifies each wireless communication device.

Furthermore, in another aspect of the stated invention, information that identifies each wireless communication device that has already been used is stored in the service providing apparatus.

Furthermore, in a preferred aspect of the stated invention, the configuration process performed by the configuration unit is executed when it has been detected that the wireless communication device has been attached to the interface unit.

Furthermore, in a preferred aspect of the stated invention, the service providing apparatus is a printer, and the service use apparatus is a computer.

Another aspect of the invention is a wireless communication system including a service providing apparatus that provides a digital processing service, a service use apparatus that uses the service, and a portable wireless communication device for the service use apparatus to wirelessly communicate with the service providing apparatus. The service providing apparatus has a wireless communication unit that performs wireless communication; a service providing-side interface unit to which the wireless communication device can be attached; a generation unit that generates configuration information for wireless communication; and a configuration unit that executes, on the wireless communication device attached to the interface unit, based on the configuration information generated by the generation unit, a configuration process that enables wireless communication between the service use apparatus to which the wireless communication device has been attached and the wireless communication unit. The service use apparatus has a service use-side interface unit to which the wireless communication device can be attached and a drive unit for using the wireless communication device. When the wireless communication device for which the configuration process has been executed is attached to the service use-side interface unit, wireless communication between the service use apparatus and the service providing apparatus is enabled by the drive unit.

Furthermore, in a preferred aspect of the stated invention, in the case where the configuration process has not yet been executed by the configuration unit of the service providing apparatus on the wireless communication device attached to the service use-side interface unit, the service use apparatus communicates, to a user, a message indicating that the wireless communication device should be attached to the service providing apparatus.

Yet another aspect of the invention is a wireless communication method for a wireless communication system, the system including a service providing apparatus that provides a digital processing service, a service use apparatus that uses the service, and a portable wireless communication device for the service use apparatus to wirelessly communicate with the service providing apparatus, and the method including the steps of: the service providing apparatus executing, on the wireless communication device when the wireless communication device is attached to the service providing apparatus, a configuration process that enables wireless communication between the service use apparatus to which the wireless communication device has been attached and the service providing apparatus; and the service use apparatus enabling wireless communication with the service providing apparatus via the attached wireless communication device when the wireless communication device on which the configuration process has been executed is attached to the service use apparatus.

Further advantages and aspects of the invention will be made clear through an exemplary embodiment of the invention described hereinafter.

BRIEF DESCRIPTION OF THE DRAWINGS

The invention will be described with reference to the accompanying drawings, wherein like numbers reference like elements.

FIG. 1 is a configuration diagram illustrating an exemplary embodiment of a wireless communication system according to the invention.

FIGS. 2A and 2B are diagrams illustrating an operation procedure that a user carries out in order to implement wireless communication between a PC and a printer.

FIG. 3 is a flowchart illustrating an exemplary processing procedure carried out when a wireless dongle is attached to the printer.

DESCRIPTION OF EXEMPLARY EMBODIMENTS

Figures 4, 5:
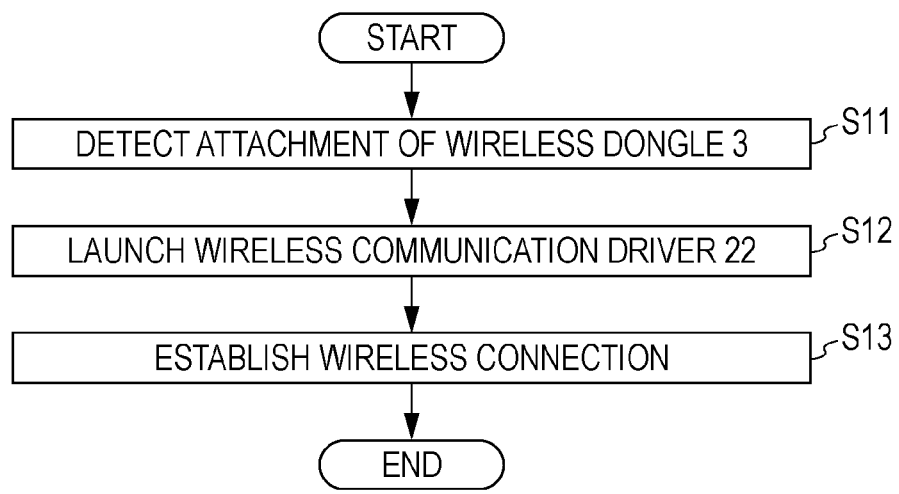
FIG. 4 is a diagram illustrating an example of wireless configuration information that is generated.
FIG. 5 is a flowchart illustrating an exemplary processing procedure carried out when a wireless dongle is attached to the PC.

Hereinafter, an exemplary embodiment of the invention will be described with reference to the drawings. However, the exemplary embodiment is not intended to limit the technical scope of the invention. Note also that in the drawings, identical or similar elements will be described as having been assigned identical reference numerals or reference characters.

FIG. 1 is a configuration diagram illustrating an exemplary embodiment of a wireless communication system according to the invention. A wireless communication system 1 illustrated in FIG. 1 is a wireless communication system according to the invention, and wireless communication between a printer 4 serving as a service providing apparatus that provides a digital processing service, or in other words, a service providing apparatus according to the invention, and a PC (personal computer) 2 serving as an example of a service use apparatus that uses the (service of the) printer 4 is carried out via a wireless dongle 3 serving as a wireless communication device. When the wireless dongle 3 serving as a generic wireless communication device is attached to the printer 4, the printer 4 sets wireless configuration information generated by the printer 4 in a register 33 of the wireless dongle 3; if the wireless dongle 3 is attached to the PC 2, a state in which a wireless communication connection is created between the PC 2 and the printer 4 is established, which makes configurations for enabling wireless communication easier than in the past and also enables the easy construction of a device environment for that purpose.

The wireless communication system 1 is, as shown in FIG. 1, configured of the PC 2, the wireless dongle 3, and the printer 4. As is typically the case, the printer 4 is capable of being used by multiple PCs (2, 2a, 2b, 2c, and so on), and respective wireless communication systems 1 can be configured with the printer 4 using respective wireless dongles (3a, 3b, 3c, and so on) that correspond to respective PCs (2a, 2b, 2c, and so on).

The PCs (2, 2a, 2b, 2c, and so on) have identical configurations, and the wireless dongles (3, 3a, 3b, 3c, and so on) have identical configurations as well; thus the following descriptions will discuss the PC 2 and the wireless dongle 3.

The PC 2 is a generic personal computer, and although not shown, includes a CPU, various types of memories, a hard disk, a display device, an operation device, and so on. The PC 2 also includes a driver (not shown) for the printer 4 serving as a driver for using a peripheral device and a wireless communication driver 22 serving as a driver for the wireless dongle 3. Furthermore, the PC 2 includes an I/F unit 21 that performs functions for interfacing with devices that are attached to the PC 2; here, the wireless dongle 3 is capable of being attached to the PC 2, and when the wireless dongle 3 is attached, data exchange is carried out via the I/F unit 21. For example, communication according to the USB standard is carried out.

Note that the wireless communication driver 22 is configured of a driver program, a control unit (CPU) that executes processing in accordance with that program, and so on; this driver program is installed in the PC 2 from a storage medium such as a CD, or is installed in the PC 2 by the wireless dongle 3 when the wireless dongle 3 is attached thereto.

In this manner, the PC 2 is a generic computer in which driver programs for various used devices have been installed, and thus no special preparations are necessary in order to function as the wireless communication system 1.

Next, the wireless dongle 3 is, as described above, a generic, portable wireless communication device, and has, for example, a configuration such as that shown in FIG. 1. The wireless dongle 3 primarily includes a wireless H/W module 31, and this module 31 includes a communication control unit 32 that has the register 33, a physical layer control unit 34, a wireless transmission/reception unit 35, and an antenna 36.

The communication control unit 32 is an element that controls wireless communication between an apparatus to which the wireless dongle 3 has been attached (here, the PC 2) and a communication partner (here, the printer 4), and carries out processing based on various types of wireless configuration information set (written) in the register 33. Although the USB standard is given here as an example of the interface used when the wireless dongle 3 is attached to another device, other standards may be used as well.

Next, the printer 4 is a service providing apparatus that provides a printing service as the aforementioned digital processing service, and may be an apparatus that uses any printing system. Although not shown, the printer 4 includes a controller unit and a printing mechanism unit, and performs, upon receiving requests from the various PCs, a process for printing onto a printing medium through operations performed by the printing mechanism unit based on control performed by the controller unit.

In addition, as shown in FIG. 1, the printer 4 includes a wireless communication module 42 that performs functions for wirelessly communicating with other devices; the module 42 includes a wireless configuration information generation unit 43 and a wireless configuration unit 44.

The wireless configuration information generation unit 43 is an element that generates wireless configuration information to be set in the register 33 of the wireless dongle 3 when communicating with another device using the wireless dongle 3. Meanwhile, the wireless configuration unit 44 is an element that executes a process for setting the information generated by the wireless configuration information generation unit 43 in the register 33 of the wireless dongle 3 that is attached to the printer 4. The wireless configuration information generation unit 43 and the wireless configuration unit 44 are the primary characteristic elements of the wireless communication system 1, and the content of the processing performed thereby will be described later. Note that the wireless configuration information generation unit 43 and the wireless configuration unit 44 are configured of programs specifying processing procedures, control devices that execute processing in accordance with those programs, memories in which those programs and various types of data are stored, and so on.

Meanwhile, an I/F unit 41 is an element that performs functions for interfacing with devices that are attached to the printer 4; here, the wireless dongle 3 is capable of being attached to the printer 4, and when the wireless dongle 3 is attached, data exchange is carried out via the I/F unit 41. For example, communication according to the USB standard is carried out.

With the wireless communication system 1 configured as described thus far, a characteristic is in the configuration process for enabling wireless communication, and hereinafter, processing performed up until a wireless communication connection is established between the PC 2 in the printer 4 will be described focusing on this configuration process.

FIGS. 2A and 2B are diagrams illustrating an operation procedure that a user carries out in order to implement wireless communication between the PC 2 and the printer 4. In the case where the printer 4 is to be used from the PC 2 using the wireless dongle 3, as described before, first, the user attaches, to the printer 4, the wireless dongle 3 in which the configuration process has not been carried out (FIG. 2A). After this, the user attaches that wireless dongle 3 to the PC 2 (FIG. 2B). The configuration process of the wireless dongle 3 and the process for connecting the PC 2 and the printer 4 are both executed through this simple operation, and the printer 4 can be used from the PC 2 thereafter.

Note that the configuration process of the wireless dongle 3 has been completed at the stage of operations indicated in FIG. 2A, whereas the communication process using the wireless dongle 3 in which the configuration process has been completed is performed at the stage indicated in FIG. 2B. Note that it is assumed that the PC 2 already includes the wireless communication driver 22 mentioned earlier. In other words, it is assumed that the driver program for the wireless dongle 3 has already been installed.

Next, the specific content of the processing executed through the aforementioned operations will be described. FIG. 3 is a flowchart illustrating an exemplary processing procedure carried out when the wireless dongle 3 is attached to the printer 4. In other words, this flowchart illustrates the processing executed during the state illustrated in FIG. 2A.

When the wireless dongle 3 is attached to the printer 4 in which the configuration process has not yet been performed, the aforementioned I/F unit 41 detects this attachment (step S1), and the wireless communication module 42 is notified that the wireless dongle 3 has been attached.

Then, the wireless configuration information generation unit 43 generates the wireless configuration information (step S2). FIG. 4 is a diagram illustrating an example of the wireless configuration information that is generated. This information, which includes an IP address, can be generated by the wireless configuration information generation unit 43 as necessary based on predefined values and predefined rules. Aside from the IP address, the information in this wireless configuration information can be used as-is for any wireless dongle 3, and in the wireless communication system 1, the same wireless configuration information aside from the IP address is generated regardless of which wireless dongle (3, 3a, 3b, 3c, and so on) is attached.

In the generation of the IP address, it is necessary to generate an address that has thus far not been used; thus IP addresses that have already been issued (generated and set) can be stored in a non-volatile memory or the like provided in the printer 4, thus avoiding the generation of identical IP addresses. As an alternative method, the IP addresses that are currently in use are acquired through searching the network on which the printer 4 is used, and an IP address different from those addresses can then be generated. Further still, in the case where a DHCP server is available, instructions may be made for acquiring an IP address from the DHCP server when communication is carried out from the PC 2 using the wireless dongle 3.

Note that rather than generating all of the wireless configuration information at this point in time, some or all of the wireless configuration information may be generated and stored in advance when, for example, the printer 4 is turned on, and that stored information may then be read out at this point in time.

When the wireless configuration information is generated in this manner, the wireless configuration unit 44 sets the wireless configuration information by accessing the attached wireless dongle 3 via the I/F unit 41 and writing the generated wireless configuration information into the register 33 of the wireless dongle 3 (step S3). Through this process, the configuration process of the wireless dongle 3 is completed, and when that wireless dongle 3 is then attached to the PC 2, wireless communication between the PC 2 and the printer 4 (the wireless communication module 42) can then be carried out via that wireless dongle 3.

The processing for attaching the wireless dongle 3 to the printer 4 is completed through the processing described thus far; after this, that wireless dongle 3 is removed from the printer 4 and attached to the PC 2 by the user.

Note that as described based on FIG. 1, the printer 4 is used by multiple PCs, and thus the printer 4 executes the same configuration process with respect to multiple wireless dongles that are attached to and used by the respective PCs. Accordingly, the printer 4 carries out the aforementioned configuration process not once, but each time an unconfigured wireless dongle is attached thereto. However, as described earlier, a different IP address is generated and set each time. Accordingly, a unique IP address that is not set in any other wireless dongles is set in each wireless dongle. That IP address thus becomes information by which each individual wireless dongle can be distinguished from other wireless dongles.

Although the above configuration process is described with respect to a case where an unconfigured dongle, for which the configuration process has not yet been carried out, has been attached, it should be noted that the same configuration process is carried out on a wireless dongle that has already undergone a configuration process by being attached to a printer aside from the printer 4, a wireless dongle that has already been configured by the user using a PC or the like, and so on when such a dongle is attached to the printer 4. In such a case, when the wireless dongle is attached, the wireless configuration unit 44 first displays, on a display panel provided in the printer 4, a message requesting the user to confirm whether or not to change the configuration. After this, in the case where the user has, in response to the display, performed an operation instructing the configuration to be changed, the aforementioned configuration process is executed. Meanwhile, in the case where the user has performed an operation instructing the configuration not to be changed, the aforementioned configuration process is not executed. In addition, if the attached wireless dongle is capable of holding multiple different sets of configuration content, and in the case where a new configuration is to be made without changing the content that has already been configured, the aforementioned configuration process may be executed without displaying the aforementioned message.

FIG. 5 is a flowchart illustrating an exemplary processing procedure carried out when the wireless dongle 3 is attached to the PC 2. As described earlier, when the wireless dongle 3 is attached to the PC 2, the I/F unit 21 detects that attachment (step S11), and the wireless communication driver 22 is notified that the wireless dongle 3 has been attached. Then, the wireless communication driver 22 is launched (step S12) and operates according to the configuration of the attached wireless dongle 3, or in other words, based on the aforementioned information set in the register 33; a wireless connection with the printer 4 is thus established (step S13).

Thereafter, in the case where the PC 2 makes a printing request to the printer 4, printing request data is transmitted to the printer 4 via the attached wireless dongle 3, and the printer 4 executes a printing process.

Meanwhile, in the case where a wireless dongle for which the aforementioned configuration process has been completed is attached to another PC, the same processing is executed, and the printer 4 can then be used through wireless communication carried out via the wireless dongle.

As a variation on the exemplary embodiment described thus far, in the case where an unconfigured wireless dongle 3, for which the aforementioned configuration process has not been carried out using the printer 4, has been attached to the PC 2, a message for alerting the user that that dongle should first be attached to the printer 4 may be displayed upon the display apparatus of the PC 2. Through this, when a user who is unaware of the easy setup afforded by the invention (that is, that the wireless configuration is completed simply by attaching the wireless dongle 3 to the printer 4) attempts to attach an unconfigured wireless dongle 3 to the PC 2 and use the PC 2, the user can be caused to complete the wireless configuration in an easy manner using the aforementioned message.

Note that with this variation, it is necessary to provide the PC 2 with functionality for detecting that the wireless dongle 3 has not yet been configured and functionality for displaying the aforementioned message. To be more specific, a utility program for executing the aforementioned functionality that is supplied along with the driver programs and so on for the printer 4 is installed in the PC 2, and the aforementioned functionality is realized by the control unit of the PC 2 operating in accordance with that program.

As described thus far, with the wireless communication system 1 according to the exemplary embodiment of the invention, when a user attempts to use the printer 4 through wireless communication, the wireless communication configuration operations, which normally require specialized knowledge, can be executed simply by attaching the wireless dongle 3 to the printer 4, significantly increasing the convenience for the user.

In addition, special preparations for performing this configuration have been carried out only in the printer 4; in other words, if the user has the printer 4, he/she can use a generic PC and a generic wireless dongle, and thus it can be said that this method is easy in terms of the device environment.

Furthermore, with the printer 4, the configuration process is repeatedly executed for the attached wireless dongle 3, and thus multiple wireless dongle configurations that are required when the printer 4 is used from multiple PCs can also be carried out with ease. In addition, special preparations have been carried out only in the printer 4 even in such a case where the printer 4 is used from multiple PCs, and thus in such a case, the aforementioned advantages in terms of the device environment are even more marked.

Furthermore, when the wireless dongle 3 is attached to the PC 2 and used, the configuration process has already been completed, and thus the time required for that processing is no longer necessary; this makes it possible to establish a wireless connection faster than a method in which the configuration process is carried out when the wireless dongle 3 is attached to the PC 2.

Although the service providing apparatus for a digital processing service is described as a printer in the exemplary embodiment of the invention, it should be noted that the invention can also be applied in the case where the service providing apparatus is a projector, a scanner, a digital camera, a monitor, a storage device capable of being used from a PC via a network (a hard disk system or the like), and so on.

The scope of protection afforded by the invention is not limited to the aforementioned embodiments, and is instead defined by the invention described in the appended claims and equivalents thereof.

The entire disclosure of Japanese Patent Application No. 2009-157878, filed Jul. 2, 2009 is expressly incorporated by reference herein.

What is claimed is:

1. A service providing apparatus that provides a digital processing service and performs wireless communication with a service use apparatus that uses the service, the service providing apparatus comprising:
    an interface unit that interfaces with a portable wireless communication device that is used by the service use apparatus to perform wireless communication when the portable wireless communication device is attached to the service use apparatus; and
    a wireless communication unit that includes:
        a generation unit that generates configuration information for wireless communication; and
        a configuration unit that executes, on the portable wireless communication device attached to the interface unit, based on the configuration information generated by the generation unit, a configuration process that enables wireless communication between the service use apparatus to which the portable wireless communication device has been attached and the wireless communication unit.

2. The service providing apparatus according to claim 1, wherein the portable wireless communication device includes a register; and
    the configuration unit enables the wireless communication by setting the configuration information in the register.

3. The service providing apparatus according to claim 2,
wherein the configuration unit is capable of executing the configuration process for two or more portable wireless communication devices; and
the configuration information set in the register is the same for all of the portable wireless communication devices aside from information that identifies each portable wireless communication device.

4. The service providing apparatus according to claim 3,
wherein information that identifies each portable wireless communication device that has already been used is stored in the service providing apparatus.

5. The service providing apparatus according to claim 1,
wherein the configuration process performed by the configuration unit is executed when it has been detected that the portable wireless communication device has been attached to the interface unit.

6. The service providing apparatus according to claim 1,
wherein the service providing apparatus is a printer; and
the service use apparatus is a computer.

7. A wireless communication system comprising a service providing apparatus that provides a digital processing service, a service use apparatus that uses the service, and a portable wireless communication device for the service use apparatus to wirelessly communicate with the service providing apparatus,
wherein the service providing apparatus includes:
a service providing-side interface unit to which the portable wireless communication device is attachable; and
a wireless communication unit that includes:
a generation unit that generates configuration information for wireless communication; and
a configuration unit that executes, on the portable wireless communication device attached to the interface unit, based on the configuration information generated by the generation unit, a configuration process that enables wireless communication between the service use apparatus to which the portable wireless communication device has been attached and the wireless communication unit,
the service use apparatus includes:
a service use-side interface unit to which the portable wireless communication device is attachable; and
a drive unit for using the portable wireless communication device, and
wherein when the portable wireless communication device for which the configuration process has been executed is attached to the service use-side interface unit, wireless communication between the service use apparatus and the service providing apparatus is enabled by the drive unit.

8. The wireless communication system according to claim 7,
wherein in the case where the configuration process has not yet been executed by the configuration unit of the service providing apparatus on the portable wireless communication device attached to the service use-side interface unit, the service use apparatus communicates, to a user, a message indicating that the portable wireless communication device should be attached to the service providing apparatus.

9. A service providing apparatus that provides a digital processing service, the service providing apparatus comprising:
an interface unit that interfaces with a portable wireless communication device that is used by the service use apparatus to perform wireless communication; and
a wireless communication unit that includes:
a configuration unit that executes, on the portable wireless communication device attached to the interface unit, based on configuration information for wireless communication, a configuration process that enables wireless communication between the service use apparatus and the wireless communication unit via the portable wireless communication device.

\* \* \* \* \*